United States Patent
Lee et al.

(10) Patent No.: US 10,263,956 B2
(45) Date of Patent: Apr. 16, 2019

(54) PHYSICAL LEVEL-BASED SECURITY SYSTEM FOR DATA SECURITY OF SECURITY TERMINAL AND METHOD USING THE SAME

(71) Applicant: ELECTRONICS AND TELECOMMUNICATIONS RESEARCH INSTITUTE, Daejeon (KR)

(72) Inventors: Yunkoo Lee, Daejeon (KR); Donggeon Lee, Daejeon (KR); Minkyu Joo, Gumi-si (KR); Sangwoon Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 115 days.

(21) Appl. No.: 15/218,195

(22) Filed: Jul. 25, 2016

(65) Prior Publication Data

US 2017/0257346 A1 Sep. 7, 2017

(30) Foreign Application Priority Data

Mar. 7, 2016 (KR) .................. 10-2016-0027131

(51) Int. Cl.
H04L 29/06 (2006.01)
(52) U.S. Cl.
CPC .......... H04L 63/0245 (2013.01); H04L 63/10 (2013.01)

(58) Field of Classification Search
CPC ...................... H04L 63/0245; H04L 63/10
See application file for complete search history.

(56) References Cited

U.S. PATENT DOCUMENTS

| 7,212,962 | B2* | 5/2007 | Masushige | H04L 63/0281 |
| | | | | 703/14 |
| 8,667,167 | B2* | 3/2014 | Fang | H04L 47/263 |
| | | | | 709/233 |
| 8,769,172 | B2* | 7/2014 | Soffer | G06F 3/023 |
| | | | | 710/62 |
| 9,639,491 | B2* | 5/2017 | Chang | G06F 13/4022 |
| 2010/0223403 | A1* | 9/2010 | Chau | G06K 19/07 |
| | | | | 710/14 |
| 2012/0159651 | A1 | 6/2012 | Beacham | |

FOREIGN PATENT DOCUMENTS

| KR | 10-2008-0008001 A | 1/2008 |
| KR | 10-2011-0108525 A | 10/2011 |

* cited by examiner

*Primary Examiner* — Fatoumata Traore
(74) *Attorney, Agent, or Firm* — LRK Patent Law Firm

(57) ABSTRACT

A physical level-based security system for data security of a security terminal and a method using the system. The security system includes at least one normal terminal corresponding to an external network, a security terminal corresponding to an internal network and storing sensitive data, and an interface device for transmitting input information of a user to any one of the at least one normal terminal and the security terminal, and providing unidirectional transmission service from the at least one normal terminal to the security terminal.

16 Claims, 5 Drawing Sheets

PHYSICAL LEVEL-BASED SECURITY SYSTEM FOR DATA SECURITY OF SECURITY TERMINAL AND METHOD USING THE SAME

CROSS REFERENCE TO RELATED APPLICATION

This application claims the benefit of Korean Patent Application No. 10-2016-0027131, filed Mar. 7, 2016, which is hereby incorporated by reference in its entirety into this application.

BACKGROUND OF THE INVENTION

1. Technical Field

The present invention relates to physical level-based security technology for data security of a security terminal, which can provide physically reliable security so that data stored in a security terminal is not leaked.

2. Description of the Related Art

Generally, iDisplay (enabling Wi-Fi and USB connection), Splashtop Remote Desktop HD (enabling Wi-Fi, 3G, and other communications), and the like are types of virtual desktop products configured to transmit host-side (Windows or the like) screen information to a terminal device such as a tablet computer, a smart phone, or a normal Personal Computer (PC) in a wired/wireless manner, such as a manner of communicating via Universal Serial Bus (USB), Local Area Network (LAN) or Wi-Fi, and to allow the terminal device to transmit information input through a keyboard or a mouse to the host. These types of products have been utilized so as to allow a user to access multiple computers via Virtual Desktop Infrastructure (VDI) service and to be provided with the service or to manage information. Since these products have the possibility of improving security due to the characteristics of VDI, in which important information is not stored in a terminal, they have attracted attention.

However, in typical cases, these products may function not only to provide information personally input/output by a user to the screen of an accessed terminal, but also to run various types of application programs, and thus the terminal is inevitably present as a complicated non-preemptive Operating System (OS). Consequently, a security hole is inevitably present in the terminal, and various types of security programs for compensating for such a security hole must be installed on the terminal. However, in spite of this, the possibility of the information stored in the terminal being leaked is not completely eliminated, but inevitably remains. For example, in the case of an existing product which transmits a screen from PC_0 to PC_1 using a USB connection and transmits information about an input device connected to PC_1 to PC_0, sensitive information from PC_1 may be leaked to PC_0 through the use of a timing field or a reserved field while the input device information is being transmitted.

Therefore, enterprise or government agencies which handle important information must unavoidably adopt a scheme in which the networks are separated and PCs are divided for an external network and an internal network and then used. A Keyboard-Video Monitor-Mouse (KVM) is the only scheme for providing convenience to the user in this system, and is configured such that interference between PCs is fully eliminated by physically separating input/output devices. By means of this, complete security may be consequently realized, but this scheme is not efficient due to very complicated tasks including data copying. That is, this scheme is a solution for completely blocking the leakage of information to the outside when a closed network and the Internet are used together. However, it is impossible to update applications on PCs connected to a closed network, and there is difficulty in that all management operations for the closed network must be individually performed using a manual operation through a third storage medium. That is, it is apparent that it is impossible to execute a web browser or other application programs on a PC in a No. 0 network and a PC in a No. 1 network, and to perform tasks of attempting to capture, copy or paste information between application programs.

PRIOR ART DOCUMENTS

Patent Documents (Patent Document 1) U.S. Pat. No. 8,769,172, Date of Registration: Jul. 1, 2014 (entitled "Secure KVM device ensuring isolation of host computers")

SUMMARY OF THE INVENTION

Accordingly, the present invention has been made keeping in mind the above problems occurring in the prior art, and an object of the present invention is to guarantee the security of physically secure data while performing a task as if it were being performed through a single terminal, by outputting the screen of a terminal connected to an external network via the monitor of a terminal connected to an internal network.

Another object of the present invention is to securely transmit data without utilizing a third storage medium when transmitting data from an external network to an internal network.

A further object of the present invention is to fundamentally remove the cause of information leakage by processing personal information or important enterprise information in a physically secure area without utilizing a security program or a complicated authentication procedure, which incurs additional expenses.

In accordance with an aspect of the present invention to accomplish the above objects, there is provided a physical level-based security system for data security of a security terminal, including at least one normal terminal corresponding to an external network; a security terminal corresponding to an internal network and storing sensitive data; and an interface device for transmitting input information of a user to any one of the at least one normal terminal and the security terminal, and relaying data from the at least one normal terminal to the security terminal in conformity with unidirectional transmission, wherein the interface device relays the data such that a communication event corresponding to the security terminal does not influence a communication event corresponding to the at least one normal terminal.

The communication event corresponding to the security terminal may be at least one of a control signal, a data signal, and a timing and signal waveform, which are related to communication between the interface device and the security terminal, and the communication event corresponding to the at least one normal terminal may be at least one of a control signal, a data signal, and a timing and signal waveform, which are related to communication between the at least one normal terminal and the interface.

A data transfer rate between the at least one normal terminal and the interface device and a data transfer rate between the interface device and the security terminal may be separately set so that failure in transmission of data does not occur.

The data may be encrypted and transmitted based on at least one of the at least one normal terminal and the interface device.

The input information may be applied based on at least one input module connected to the interface device.

The interface device may select any one input target terminal, to which the input information is to be transmitted, from among the at least one normal terminal and the security terminal based on the at least one input module, and transmit the input information to the at least one normal terminal without passing through the security terminal when the at least one normal terminal is selected as the input target terminal.

When the at least one normal terminal is selected as the input target terminal, a screen corresponding to the at least one normal terminal may be output via a monitor connected to the security terminal based on the interface device.

The interface device may select the input target terminal in response to a preset key stroke that is input through a keyboard corresponding to the at least one input module.

The interface device may be configured such that, if the at least one normal terminal is selected using a mouse corresponding to the at least one input module while the input target terminal is the security terminal, the input target terminal switches to the at least one normal terminal.

The interface device may be configured such that, if a pointer of the mouse is moved to an outside of a screen of the at least one normal terminal while the input target terminal is the at least one normal terminal, the input target terminal switches to the security terminal.

When an independent Plug-and-Play (PNP) device is connected to the interface device, the security terminal may recognize the independent PNP device.

In accordance with another aspect of the present invention to accomplish the above objects, there is provided a physical level-based security method for data security of a security terminal, including individually connecting at least one normal terminal corresponding to an external network and a security terminal corresponding to an internal network to an interface device; selecting any one input target terminal to which input information of a user is to be transmitted, from among the at least one normal terminal and the security terminal; transmitting the input information to the input target terminal based on the interface device; and relaying, by the interface device, data from the at least one normal terminal to the security terminal in conformity with unidirectional transmission, wherein the interface device relays the data such that a communication event corresponding to the security terminal does not influence a communication event corresponding to the at least one normal terminal.

The communication event corresponding to the security terminal may be at least one of a control signal, a data signal, and a timing and signal waveform, which are related to communication between the interface device and the security terminal, and the communication event corresponding to the at least one normal terminal may be at least one of a control signal, a data signal, and a timing and signal waveform, which are related to communication between the at least one normal terminal and the interface.

The physical level-based security method may further include separately setting a data transfer rate between the at least one normal terminal and the interface device and a data transfer rate between the interface device and the security terminal so that failure in transmission of data does not occur.

The data may be encrypted and transmitted based on at least one of the at least one normal terminal and the interface device.

The input information may be applied based on at least one input module connected to the interface device.

Transmitting the input information may be configured to transmit the input information to the at least one normal terminal without passing through the security terminal when the at least one normal terminal is selected as the input target terminal.

Selecting any one input target terminal may be configured to select the input target terminal in response to a preset key stroke that is input through a keyboard corresponding to the at least one input module.

The physical level-based security method may further include, when the at least one normal terminal is selected as the input target terminal, outputting a screen corresponding to the at least one normal terminal via a monitor connected to the security terminal based on the interface device.

The physical level-based security method may further include if the at least one normal terminal is selected using a mouse corresponding to the at least one input module while the input target terminal is the security terminal, switching the input target terminal to the at least one normal terminal; and if a pointer of the mouse is moved to an outside of a screen of the at least one normal terminal while the input target terminal is the at least one normal terminal, switching the input target terminal to the security terminal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
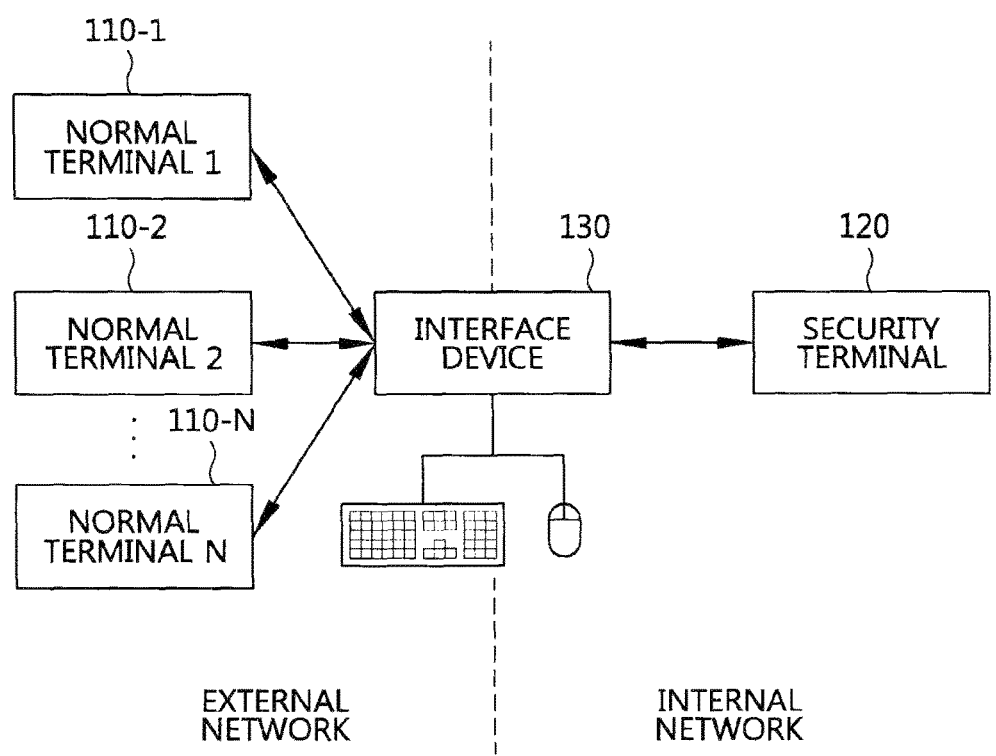
FIG. 1 is a block diagram showing a physical level-based security system for data security of a security terminal according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing a physical level-based security system for data security of a security terminal according to an embodiment of the present invention.

Referring to FIG. 1, the physical level-based security system for data security of a security terminal according to the embodiment of the present invention includes at least one normal terminal 110-1 to 110-N, a security terminal 120, and an interface device 130.

The at least one normal terminal 110-1 to 110-N may correspond to an external network.

Here, "at least one normal terminal 110-1 to 110-N" may mean a terminal having lower security than that of the security terminal 120. For example, this terminal may be a terminal connected to the Internet.

The external network provides a path for transferring data between the at least one normal terminal 110-1 to 110-N and the interface device 130, and may be a concept including all existing networks that are conventionally used and networks that can be developed in the future. For example, the network may be a wired/wireless Local Area Network (LAN) for providing communication between various types of information devices in a limited area, a mobile communication network for providing communication between individual moving objects and between a moving object and an external system outside the moving object, or a satellite communication network for providing communication between individual earth stations using satellites, or may be any one of wired/wireless communication networks or a combination of two or more thereof.

The security terminal 120 may correspond to an internal network and may store security data.

In this case, when the data stored in the security terminal 120 is leaked, a user may be damaged, and thus the security terminal may mean a terminal in which data to be securely kept is stored. For example, the security terminal 120 may be a terminal connected to the internal connection network of a government agency or an enterprise.

Here, the internal network provides a path for transferring data between the security terminal 120 and the interface device 130, and may be a type of network having characteristics similar to the intranet, which is isolated from the Internet and corresponds to a specific agency or an enterprise. Therefore, the internal network may be a network that is physically isolated from the external network corresponding to the at least one normal terminal 110-1 to 110-N.

The interface device 130 may transmit the input information of the user to any one of the at least one normal terminal 110-1 to 110-N and the security terminal 120, and may relay data from the at least one normal terminal 110-1 to 110-N to the security terminal 120 in conformity with unidirectional transmission.

Here, there is the possibility that both the at least one normal terminal 110-1 to 110-N and the security terminal 120 according to the embodiment of the present invention will be infected with a malicious program. That is, the present invention intends to propose a system capable of preventing data in the security terminal 120 from being leaked to the external network via the interface device 130 even in an environment in which the at least one normal terminal 110-1 to 110-N and the security terminal 120 are already infected with a malicious program.

Here, the security terminal 120 may be a simple-type terminal, such as a USB stick PC. Further, the security terminal 120 may function to perform sensitive tasks, such as electronic commerce (EC) or financial transactions. Therefore, tasks that require high-performance system resources, such as playing games or playing video, may be performed via the at least one normal terminal 110-1 to 110-N.

The at least one normal terminal 110-1 to 110-N may be a device that is connected to a communication network and is capable of communicating with the interface device 130, and may be any of various types of terminals, such as all of an information communication device, a multimedia terminal, a wired terminal, a fixed terminal, and an Internet Protocol (IP) terminal. Further, the at least one normal terminal 110-1 to 110-N may be any of mobile terminals having various mobile communication specifications, such as a mobile phone, a Portable Multimedia Player (PMP), a Mobile Internet Device (MID), a smart phone, a desktop computer, a tablet computer (PC), a notebook computer, a netbook computer, a Personal Digital Assistant (PDA), a smart TV, and an information communication device.

Here, the screen indicating the results of tasks performed via the at least one normal terminal 110-1 to 110-N may be displayed to the user via the security terminal 120.

For example, information on the screen of the at least one normal terminal 110-1 to 110-N may be transmitted to the security terminal 120 via the interface device 130. Here, the interface device 130 may directly receive input information applied by the user and may route it to a normal terminal selected from among the normal terminals 110-1 to 110-N. In this case, a monitor is connected to the security terminal 120, and the user may also view the screen of the at least one normal terminal 110-1 to 110-N via the monitor connected to the security terminal 120.

Here, in a path through which data is transmitted from the at least one normal terminal 110-1 to 110-N to the security terminal 120, the networks are separated via hardware such as the interface device 130, thus eliminating the possibility of information being leaked. That is, from the standpoint of the security terminal 120, the security terminal 120 may be operated in such a way as to independently determine whether to use the data of the at least one normal terminal 110-1 to 110-N without communicating with the at least one normal terminal 110-1 to 110-N. Further, even from the standpoint of the at least one normal terminal 110-1 to 110-N, the normal terminal may be operated in such a way as to independently determine whether to transmit its own data without communicating with the security terminal 120.

Since such a structure may prevent the possibility of the information in the security terminal 120 being transmitted to the at least one normal terminal 110-1 to 110-N using a transport protocol, the security of the security terminal 120 may be ensured.

Here, the interface device 130 may relay data so that a communication event corresponding to the security terminal 120 does not influence a communication event corresponding to the at least one normal terminal 110-1 to 110-N.

For example, information about the file system of the at least one normal terminal 110-1 to 110-N may be transmitted to the security terminal 120 via the interface device 130. Further, information in the clipboard of the at least one normal terminal 110-1 to 110-N may also be transmitted to the security terminal 120 via the interface device 130, and may be used by the security terminal 120. That is, while a required task is performed by opening a window for the at least one normal terminal 110-1 to 110-N on the screen of the security terminal 120, an operation of copying data from a specific application in the at least one normal terminal 110-1 to 110-N to a clipboard may be performed, and the copied data may be immediately utilized by the security terminal 120. Further, in the case of the file system, when a folder or a file is created in or copied to a specific directory in the at least one normal terminal 110-1 to 110-N, a directory structure and a file having the same format may also be created in the specific directory of the security terminal 120.

However, traffic or the like related to the transmission/reception of data between the interface device 130 and the security terminal 120 influences transaction events between the at least one normal terminal 110-1 to 110-N and the interface device 130, and thus there is the possibility that important information in the security terminal 120 will be leaked to the at least one normal terminal 110-1 to 110-N. Further, signal waveform characteristics occurring in the transmission/reception of data between the interface device 130 and the security terminal 120 influence signal waveform characteristics between the at least one normal terminal 110-1 to 110-N and the interface device 130, and thus there is the possibility that the important information in the security terminal 120 may be leaked.

Therefore, in order to eliminate the possibility of such information leakage, the interface device 130 may prevent a communication event between the interface device 130 and the security terminal 120 from influencing a communication event between the at least one normal terminal 110-1 to 110-N and the interface device 130 when relaying data therebetween.

Here, the communication event corresponding to the security terminal 120 may be at least one of a control signal, a data signal, and a timing and signal waveform, which are related to communication between the interface device and the security terminal, and the communication event corresponding to the at least one normal terminal 110-1 to 110-N may be at least one of a control signal, a data signal, and a timing and signal waveform, which are related to communication between the at least one normal terminal and the interface device.

In other words, a nonempty subset of a set of communication events between the interface device 130 and the security terminal 120 may not influence a nonempty subset of a set of communication events between the at least one normal terminal 110-1 to 110-N and the interface device 130.

Here, the data transfer rate between the at least one normal terminal 110-1 to 110-N and the interface device 130 and the data transfer rate between the interface device 130 and the security terminal 120 may be separately set so that failure in data transmission does not occur. That is, the user or the system itself, including the interface device 130, initially sets the data transfer rates between the devices to suitable values, thus preventing a transmission operation from failing.

Therefore, consequently, a communication event between the interface device 130 and the security terminal 120 may not influence a communication event between the at least one normal terminal 110-1 to 110-N and the interface device 130.

If a situation in which a communication event between the interface device 130 and the security terminal 120 influences a communication event between the at least one normal terminal 110-1 to 110-N and the interface device 130 occurs, there is the possibility that the information in the security terminal 120 will be leaked.

For example, when the at least one normal terminal 110-1 to 110-N requests the transmission/reception of data from the interface device 130, the interface device 130 may send a response, indicating that the transmission/reception request received from the at least one normal terminal 110-1 to 110-N cannot be immediately processed due to an event occurring during communication between the interface device 130 and the security terminal 120, to the at least one normal terminal 110-1 to 110-N. If such a response is used, the data stored in the security terminal 120 may be leaked in such a way that two normal terminals infected with a malicious program conspire to delay or not delay the transmission/reception request via the security terminal 120. Consequently, the at least one normal terminal 110-1 to 110-N may acquire information related to the security terminal 120 by means of an event that may be caused by the security terminal 120, and such movement of the information may be the cause of leakage of sensitive information corresponding to the security terminal 120 to the outside.

Here, data may be encrypted and transmitted based on at least one of the at least one normal terminal 110-1 to 110-N and the interface device 130.

For example, the at least one normal terminal 110-1 to 110-N may perform encryption and transmit encrypted data to the interface device 130. Alternatively, the interface device 130 may encrypt the data received from the at least one normal terminal 110-1 to 110-N and transmit the encrypted data to the security terminal 120.

The input information may be applied based on at least one input module connected to the interface device 130.

Here, an existing system that uses a Virtual Desktop (VD) may acquire input information of the user through an input device connected to the security terminal 120. However, in this structure, the input information applied through the input device connected to the security terminal 120 passes through various types of software stacks of the security terminal 120, and is then transmitted to a server for providing a desktop screen, with the result that the input information reaches the server. That is, a path through which the important information in the security terminal 120 may be transmitted to the server is provided. Therefore, in the present invention, the interface device 130 may directly acquire the input information of the user through at least one input module connected to the interface device 130.

Further, while the interface device 130 is transmitting the acquired input information to the security terminal 120, it does not transmit the input information to the at least one normal terminal 110-1 to 110-N, thus completely eliminating the possibility that the information in the security terminal 120 will be leaked.

In this case, any one input target terminal to which input information is to be transmitted is selected from among the at least one normal terminal 110-1 to 110-N and the security terminal 120, based on the at least one input module. When the at least one normal terminal 110-1 to 110-N is selected as the input target terminal, the input information may be transmitted to the at least one normal terminal 110-1 to 110-N without passing through the security terminal.

Here, when the at least one normal terminal 110-1 to 110-N is selected as the input target terminal, the screen corresponding to the at least one normal terminal 110-1 to 110-N may be output via a monitor connected to the security terminal 120 based on the interface device 130.

The input target terminal may be selected in response to a preset key stroke that is input through a keyboard corresponding to the at least one input module.

For example, assuming that a key stroke corresponding to the security terminal indicates that a 'Ctrl' key and an 'S' key are simultaneously pressed, if "Ctrl key+S key" are input through the keyboard, the security terminal may be selected as the input target terminal.

In this regard, the preset key stroke may be set such that at least one of multiple keys included in the keyboard is pressed.

Here, while the input target terminal is the security terminal 120, if the at least one normal terminal 110-1 to 110-N is selected using a mouse corresponding to the at least one input module, the input target terminal may switch to the at least one normal terminal 110-1 to 110-N.

For example, when the user points or clicks the screen corresponding to the at least one normal terminal 110-1 to 110-N with the pointer of the mouse, the security terminal 120 may notify the interface device 130 of the selected at least one normal terminal 110-1 to 110-N. Thereafter, the interface device 130 may switch the input target terminal and may transmit the input information to the selected at least one normal terminal 110-1 to 110-N.

Here, while the input target terminal is the at least one normal terminal 110-1 to 110-N, if the pointer of the mouse moves to the outside of the screen of the at least one normal terminal 110-1 to 110-N, the input target terminal may switch to the security terminal 120.

For example, when the mouse pointer points outside of the screen of the at least one normal terminal 110-1 to 110-N, the interface device 130 may determine the pointed location of the mouse pointer, and may stop transmitting the input information to the at least one normal terminal 110-1 to 110-N. Thereafter, the input target terminal switches to the security terminal 120, so that the input information of the user may be transmitted to the security terminal 120.

In this case, when an independent Plug-and-Play (PNP) device is connected to the interface device 130, the security terminal 120 may also recognize the independent PNP device. For example, regardless of whether at least one input module is connected to the interface device 130, if the security terminal 120 is connected to the interface device 130, a standard input module may be installed on the security terminal 120 through a Plug-and-Play (PNP) procedure.

The screen of the terminal connected to the external network is output via the monitor of the terminal connected to the internal network through such a security system, and thus the security of physically secure data may be ensured while a task is performed as if it were being performed through a single terminal.

Also, when data is transmitted from the external network to the internal network, the present invention may securely transmit the data without utilizing a third storage medium.

Further, the present invention may fundamentally remove the cause of information leakage by processing personal information or important enterprise information in a physically secure area without utilizing a security program or a complicated authentication procedure, which incurs additional expenses.

In addition, the present invention may decrease the risk of a security hole that may exist in existing schemes in which networks are separated, by performing a task as if it were being performed through a single terminal while viewing the screen associated with the external network via a window on the screen associated with the internal network, thus guaranteeing reliable security. Furthermore, the present invention may maintain security at the physical level while eliminating an inconvenience in which the transmission of data from the external network to the internal network must be manually performed through a third storage medium.

Figure 2:
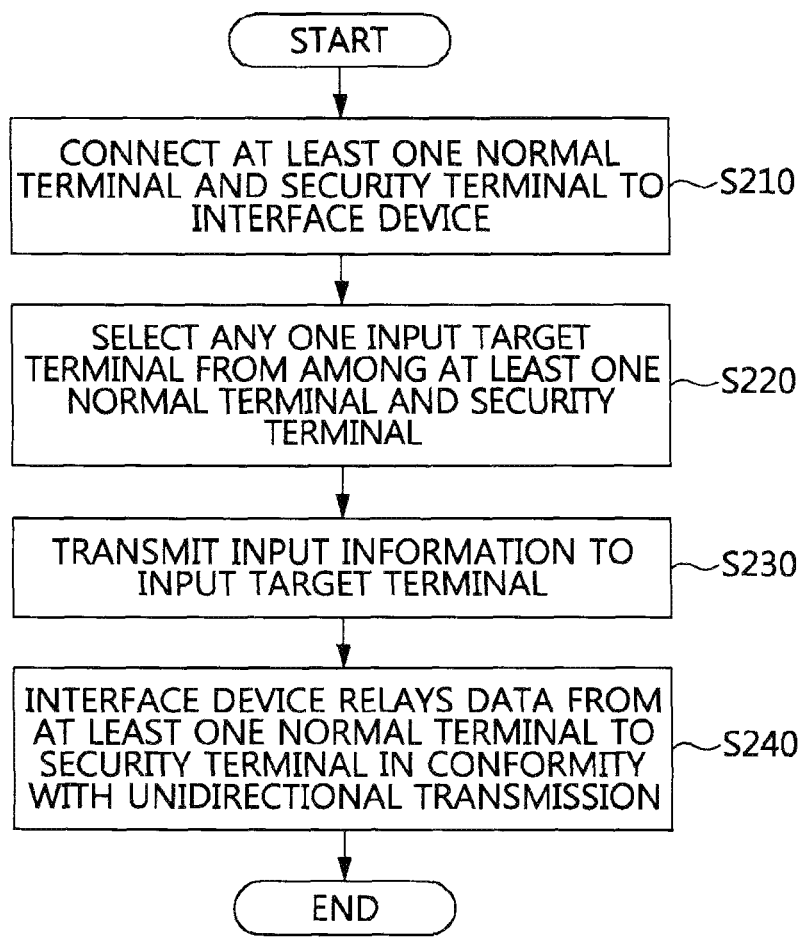
FIG. 2 is an operation flowchart showing a physical level-based security method for data security of a security terminal according to an embodiment of the present invention.

FIG. 2 is an operation flowchart showing a physical level-based security method for data security of a security terminal according to an embodiment of the present invention.

Referring to FIG. 2, the physical level-based security method for data security of a security terminal according to the embodiment of the present invention individually connects at least one normal terminal, corresponding to an external network, and a security terminal, corresponding to an internal network, to an interface device at step S210.

Here, the security terminal may be a terminal requiring high security due to the performance of tasks based on important or sensitive data of an enterprise or a government agency. Further, the at least one normal terminal may be a terminal having lower security than that of the security terminal.

Here, the external network may correspond to a path through which data is transferred between the at least one normal terminal and the interface device, and the internal network may correspond to a path through which data is transferred between the security terminal and the interface device. That is, since the external network and the internal network are separated based on the interface device, the separation of hardware occurs in a data transmission path between the at least one normal terminal and the security terminal, thus preventing information stored in the security terminal from being leaked.

In this case, the interface device may transmit the input information of the user to any one of the at least one normal terminal and the security terminal, and may relay data from the at least one normal terminal to the security terminal in conformity with unidirectional transmission.

Furthermore, the physical level-based security method for data security of a security terminal according to the embodiment of the present invention selects any one input target terminal to which the input information of the user is to be transmitted from among the at least one normal terminal and the security terminal at step S220.

Here, the input target terminal may be selected in response to a preset key stroke that is input through the keyboard corresponding to the at least one input module.

For example, assuming that the key stroke corresponding to the security terminal indicates that a 'Ctrl' key and an 'S' key are simultaneously pressed, if "Ctrl key+S key" are input through the keyboard, the security terminal may be selected as the input target terminal.

The preset key stroke may be set such that at least one of multiple keys included in the keyboard is pressed.

Here, while the input target terminal is the security terminal, if the at least one normal terminal is selected using a mouse corresponding to the at least one input module, the input target terminal may switch to the at least one normal terminal.

In this case, while the input target terminal is the at least one normal terminal, if the pointer of the mouse moves to the outside of the screen of the at least one normal terminal, the input target terminal may switch to the security terminal.

Then, the physical level-based security method for data security of a security terminal according to the embodiment of the present invention transmits the input information to the input target terminal at step S230.

Here, in an existing system that uses a Virtual Desktop (VD), the input information of the user may be acquired via an input device connected to the security terminal. However, in this structure, the input information, applied through the input device connected to the security terminal, has passed through various software stacks of the security terminal and is then transmitted to a server for providing a desktop screen, with the result that the input information reaches the server. That is, a path through which the important information in the security terminal may be transmitted to the server is provided. Therefore, in the present invention, the interface device may directly acquire the input information of the user through the at least one input module connected to the interface device, and may then transmit the input information to the input target terminal.

Here, while the interface device is transmitting the acquired input information to the security terminal, it does not transmit the input information to the at least one normal terminal, thus fundamentally eliminating the possibility of the information stored in the security terminal being leaked.

Further, in the physical level-based security method for data security of a security terminal according to the embodiment of the present invention, the interface device may relay data from the at least one normal terminal to the security terminal in conformity with unidirectional transmission, wherein the data is relayed so that a communication event corresponding to the security terminal does not influence a communication event corresponding to the at least one normal terminal, at step S240.

Here, the interface device 130 may relay data so that a communication event corresponding to the security terminal 120 does not influence a communication event corresponding to the at least one normal terminal 110-1 to 110-N.

For example, the file system information or clipboard information of the at least one normal terminal may be transmitted to the security terminal via the interface device. However, traffic or the like related to the transmission/reception of data between the interface device and the security terminal influences transaction events between the at least one normal terminal and the interface device, and thus there is the possibility that important information in the security terminal will be leaked to the at least one normal terminal. Also, the characteristics of a signal waveform occurring in the transmission/reception of data between the interface device and the security terminal influences the characteristics of a signal waveform between the at least one normal terminal and the interface device, and thus there is also the possibility that the important information in the security terminal will be leaked.

Therefore, in order to eliminate the possibility of such information leakage, the interface device may prevent a communication event between the interface device and the security terminal from influencing a communication event between the at least one normal terminal and the interface device when relaying data.

Here, the communication event corresponding to the security terminal may be at least one of a control signal, a data signal, and a timing and signal waveform, which are related to communication between the interface device and the security terminal, and the communication event corresponding to the at least one normal terminal may be at least one of a control signal, a data signal, and a timing and signal waveform, which are related to communication between the at least one normal terminal and the interface device.

In other words, a nonempty subset of a set of communication events between the interface device and the security terminal may not influence a nonempty subset of a set of communication events between the at least one normal terminal and the interface device.

Here, the data transfer rate between the at least one normal terminal and the interface device and the data transfer rate between the interface device and the security terminal may be separately set so that failure in data transmission does not occur. That is, the user or the system itself, including the interface device, initially sets the data transfer rates between the devices to suitable values, thus preventing a transmission operation from failing.

Figure 3:
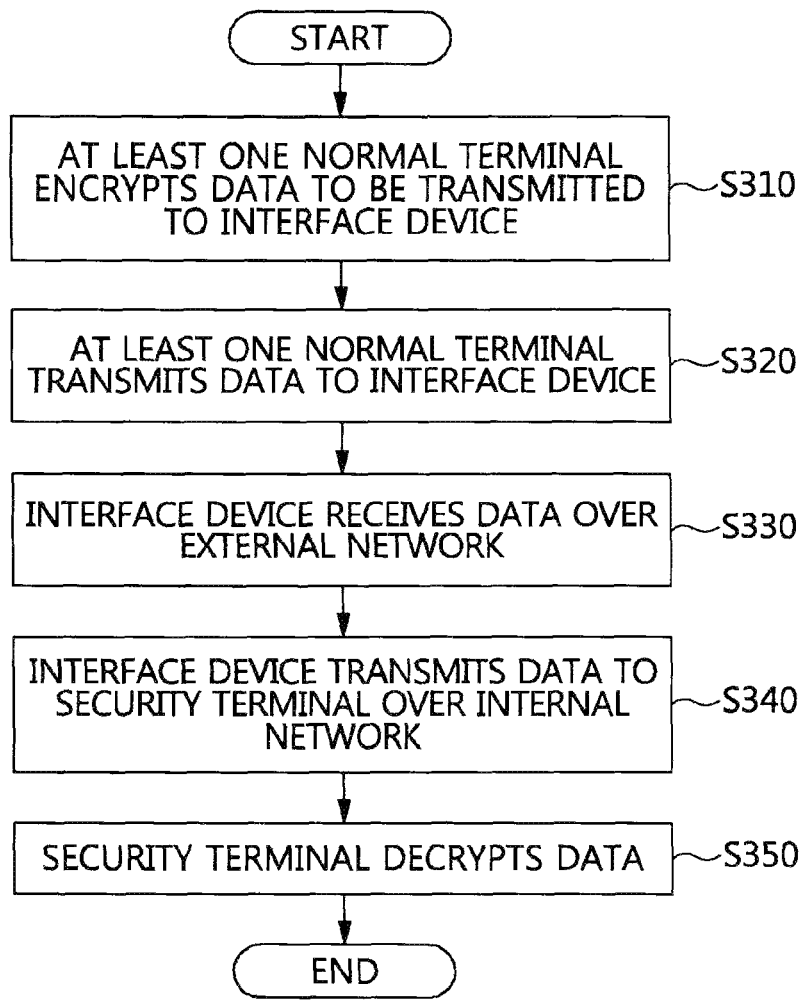
FIG. 3 is an operation flowchart showing in detail a procedure in which at least one normal terminal transmits data to the security terminal, in the security method shown in FIG. 2.

FIG. 3 is an operation flowchart showing in detail a procedure in which at least one normal terminal transmits data to the security terminal, in the security method shown in FIG. 2.

Referring to FIG. 3, the procedure in which at least one normal terminal transmits data to the security terminal, in the security method shown in FIG. 2, allows the at least one normal terminal to encrypt data to be transmitted to the interface device at step S310.

When the at least one normal terminal does not have a function of encrypting data, the interface device may perform encryption.

Next, the at least one normal terminal transmits the encrypted data to the interface device at step S320.

The encrypted data may be transmitted based on a unidirectional transport protocol.

The encrypted data may be transmitted to the interface device over the external network corresponding to the at least one normal terminal.

Thereafter, the interface device receives the encrypted data from the at least one normal terminal over the external network at step S330.

In this case, if the data received from the at least one normal terminal has not been encrypted, the interface device may encrypt the data.

Thereafter, the interface device transmits the encrypted data to the security terminal over the internal network at step S340.

Here, the interface device may prevent an event of communication with the security terminal from influencing a communication event between the at least one normal terminal and the interface device.

Thereafter, the security terminal receives and decrypts the encrypted data, and then uses the decrypted data at step S350.

Figure 4:
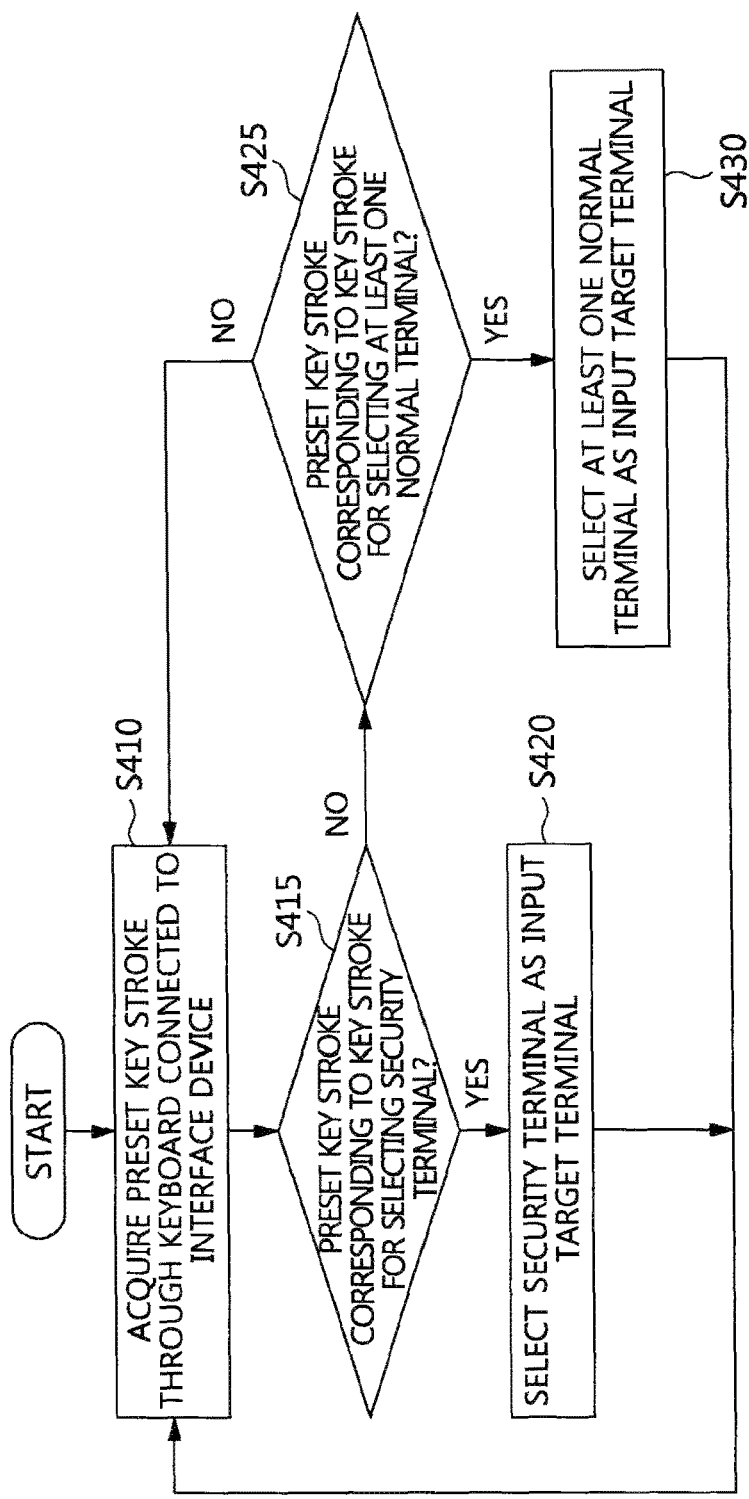
FIG. 4 is an operation flowchart showing in detail a procedure for selecting an input target terminal in the security method shown in FIG. 2.

FIG. 4 is an operation flowchart showing in detail the procedure for selecting an input target terminal in the security method shown in FIG. 2.

Referring to FIG. 4, the procedure for selecting an input target terminal in the security method shown in FIG. 2 acquires a preset key stroke through a keyboard connected to the interface device at step S410.

Here, the preset key stroke acquired through the keyboard may be a key stroke corresponding to any one of the security terminal and the at least one normal terminal. For example, the preset key stroke corresponding to the security terminal may be sequential pressing of an 'S (Security)' key and a 'K (Key)' key on the keyboard, and the preset key stroke corresponding to the at least one normal terminal may be sequential pressing of a 'C (Common)' key and a 'K (Key)' key.

Further, the preset key stroke may be easily changed by a user or a manager.

Thereafter, whether the preset key stroke is the key stroke for selecting the security terminal is determined at step S415.

If it is determined at step S415 that the preset key stroke is the key stroke for selecting the security terminal, the security terminal is selected as the input target terminal at step S420.

That is, the security terminal may be selected so that the input information acquired through at least one input module is transmitted to the security terminal.

In contrast, if it is determined at step S415 that the preset key stroke is not the key stroke for selecting the security terminal, whether the preset key stroke is a key stroke for selecting at least one normal terminal is determined at step S425.

If it is determined at step S425 that the preset key stroke is the key stroke for selecting the at least one normal terminal, the at least one normal terminal is selected as the input target terminal at step S430.

That is, the at least one normal terminal may be selected such that the input information acquired through the at least one input module is transmitted to the at least one normal terminal.

Further, if it is determined at step S425 that the preset key stroke is not the key stroke for selecting the at least one normal terminal, it is determined that the key stroke input though the keyboard is not a preset key stroke for selecting the input target terminal, and a preset key stroke may be acquired again through the keyboard.

Figure 5:
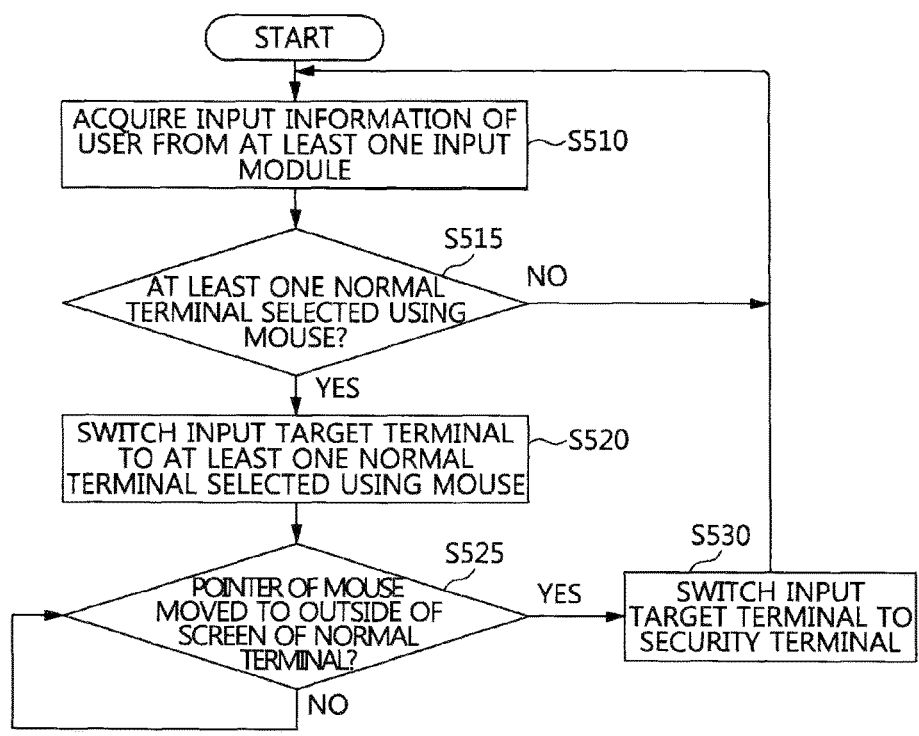
FIG. 5 is an operation flowchart showing a procedure for switching an input target terminal according to an embodiment of the present invention.

FIG. 5 is an operation flowchart showing a procedure for switching an input target terminal according to an embodiment of the present invention.

Referring to FIG. 5, in the procedure for switching an input target terminal according to the embodiment of the present invention, the performance of steps is described on the assumption that the current input target terminal is a security terminal.

The input information of the user is acquired from at least one input module at step S510.

Here, since the input target terminal is the security terminal, the interface device may transmit the input information of the user to the security terminal.

Thereafter, whether the input information corresponds to the selection of at least one normal terminal using the mouse is determined at step S515.

If it is determined at step S515 that the input information does not correspond to the selection of at least one normal terminal using the mouse, the security terminal may continuously acquire the input information of the user.

In contrast, if it is determined at step S515 that the input information corresponds to the selection of at least one normal terminal using the mouse, the input target terminal switches from the security terminal to the at least one normal terminal at step S520.

For example, when the user clicks an icon or a screen corresponding to the at least one normal terminal using the mouse while performing a task on the security terminal, the input target terminal may switch so that the task on the security terminal is stopped and the task may be performed on the at least one normal terminal.

In this case, since the input target terminal is the at least one normal terminal, the interface device may transmit the input information of the user to the at least one normal terminal.

Thereafter, whether the pointer of the mouse is moved to the outside of the screen of the at least one normal terminal is determined based on the input information at step S525.

If it is determined at step S525 that the pointer of the mouse is not moved to the outside of the screen of the at least one normal terminal, the at least one normal terminal may continuously acquire the input information of the user.

In contrast, if it is determined at step S525 that the pointer of the mouse is moved to the outside of the screen of the at least one normal terminal, the input target terminal switches from the at least one normal terminal to the security terminal at step S530.

For example, when the user moves and locates the mouse pointer outside the screen while performing a task on the at least one normal terminal, the input target terminal may switch to the security terminal so that the task on the at least one normal terminal is stopped and the task may be performed on the security terminal.

In accordance with the present invention, it is possible to guarantee the security of physically secure data while maintaining convenience in performing a task as if it were being performed through a single terminal, by outputting the screen of a terminal connected to an external network via the monitor of a terminal connected to an internal network.

Further, the present invention may securely transmit data without utilizing a third storage medium when transmitting data from an external network to an internal network.

Furthermore, the present invention may fundamentally remove the cause of information leakage by processing personal information or sensitive enterprise information in a physically secure area without utilizing a security program, a keyboard hacking prevention program, a password change procedure or a complicated authentication procedure, which incurs additional expenses.

As described above, in the physical level-based security system for data security of a security terminal and the method using the system according to the present invention, the configurations and schemes in the above-described embodiments are not limitedly applied, and some or all of the above embodiments can be selectively combined and configured so that various modifications are possible.

What is claimed is:

1. A physical level-based security system for data security of a security terminal, comprising:
   at least one normal terminal corresponding to an external network;
   a security terminal corresponding to an internal network and storing sensitive data; and
   an interface device for transmitting input information of a user to any one of the at least one normal terminal and the security terminal, and relaying data from the at least one normal terminal to the security terminal in conformity with unidirectional transmission, wherein
   the interface device relays the data such that a first communication event of the security terminal does not influence a second communication event of the at least one normal terminal, the first communication event is related to communication between the interface device and the security terminal and the second communication event is related to communication between the at least one normal terminal and the interface device, and the first and second communication events correspond to at least one of a control signal, a data signal, and a timing and signal waveform, wherein
   a first data transfer rate between the at least one normal terminal and the interface device and a second data transfer rate between the interface device and the security terminal are separately set so that failure in transmission of data for the first communication event does not occur and the second communication event does not influence the first communication event, wherein
   the security terminal independently determines whether to use the data of the at least one normal terminal without communicating with the other at least one normal terminal, and the at least one normal terminal independently determines whether to transmit its own data without communicating with the security terminal, and wherein the first communication event does not influence the second communication event.

2. The physical level-based security system of claim 1, wherein the data is encrypted and transmitted based on at least one of the at least one normal terminal and the interface device.

3. The physical level-based security system of claim 1, wherein the input information is applied based on at least one input module connected to the interface device.

4. The physical level-based security system of claim 3, wherein the interface device selects any one input target terminal, to which the input information is to be transmitted, from among the at least one normal terminal and the security terminal based on the at least one input module, and transmits the input information to the at least one normal terminal without passing through the security terminal when the at least one normal terminal is selected as the input target terminal.

5. The physical level-based security system of claim 4, wherein when the at least one normal terminal is selected as the input target terminal, a screen corresponding to the at least one normal terminal is output via a monitor connected to the security terminal based on the interface device.

6. The physical level-based security system of claim 4, wherein the interface device selects the input target terminal in response to a preset key stroke that is input through a keyboard corresponding to the at least one input module.

7. The physical level-based security system of claim 4, wherein the interface device is configured such that, if the at least one normal terminal is selected using a mouse corresponding to the at least one input module while the input target terminal is the security terminal, the input target terminal switches to the at least one normal terminal.

8. The physical level-based security system of claim 7, wherein the interface device is configured such that, if a pointer of the mouse is moved to an outside of a screen of the at least one normal terminal while the input target terminal is the at least one normal terminal, the input target terminal switches to the security terminal.

9. The physical level-based security system of claim 1, wherein when an independent Plug-and-Play (PNP) device is connected to the interface device, the security terminal recognizes the independent PNP device.

10. A physical level-based security method for data security of a security terminal, comprising:
individually connecting at least one normal terminal corresponding to an external network and a security terminal corresponding to an internal network to an interface device;
selecting any one input target terminal to which input information of a user is to be transmitted, from among the at least one normal terminal and the security terminal;
transmitting the input information to the input target terminal based on the interface device;
relaying, by the interface device, data from the at least one normal terminal to the security terminal in conformity with unidirectional transmission, wherein
the interface device relays the data such that a first communication event of the security terminal does not influence a second communication event of the at least one normal terminal, the first communication event s related to communication between the interface device and the security terminal and the second communication event is related to communication between the at least one normal terminal and the interface device, and the first and second communication events correspond to at least one of a control signal, a data signal, and a timing and signal waveform; and
separately setting a first data transfer rate between the at least one normal terminal and the interface device and a second data transfer rate between the interface device and the security terminal so that failure in transmission of data for the first communication event does not occur and the second communication event does not influence the first communication event, wherein
the security terminal independently determines whether to use the data of the at least one normal terminal without communicating with the other at least one normal terminal, and the at least one normal terminal independently determines whether to transmit its own data without communicating with the security terminal, and wherein
the first communication event does not influence the second communication event.

11. The physical level-based security method of claim 10, wherein the data is encrypted and transmitted based on at least one of the at least one normal terminal and the interface device.

12. The physical level-based security method of claim 10, wherein the input information is applied based on at least one input module connected to the interface device.

13. The physical level-based security method of claim 12, wherein transmitting the input information is configured to transmit the input information to the at least one normal terminal without passing through the security terminal when the at least one normal terminal is selected as the input target terminal.

14. The physical level-based security method of claim 12, wherein selecting any one input target terminal is configured to select the input target terminal in response to a preset key stroke that is input through a keyboard corresponding to the at least one input module.

15. The physical level-based security method of claim 14, further comprising, when the at least one normal terminal is selected as the input target terminal, outputting a screen corresponding to the at least one normal terminal via a monitor connected to the security terminal based on the interface device.

16. The physical level-based security method of claim 14, further comprising:
if the at least one normal terminal is selected using a mouse corresponding to the at least one input module while the input target terminal is the security terminal, switching the input target terminal to the at least one normal terminal; and
if a pointer of the mouse is moved to an outside of a screen of the at least one normal terminal while the input target terminal is the at least one normal terminal, switching the input target terminal to the security terminal.

* * * * *